United States Patent
Filho et al.

(10) Patent No.: US 10,252,389 B2
(45) Date of Patent: Apr. 9, 2019

(54) QUICK-CHANGE CLAMPING UNIT FOR TOOLHOLDER AND METHOD OF USING SAME

(71) Applicant: Kennametal Inc., Latrobe, PA (US)

(72) Inventors: Ruy Frota de Souza Filho, Latrobe, PA (US); Alan J. Bookheimer, Greensburg, PA (US)

(73) Assignee: KENNAMETAL INC., Latrobe, PA (US)

( * ) Notice: Subject to any disclaimer, the term of this patent is extended or adjusted under 35 U.S.C. 154(b) by 0 days.

(21) Appl. No.: 15/641,728

(22) Filed: Jul. 5, 2017

(65) Prior Publication Data

US 2019/0009381 A1    Jan. 10, 2019

(51) Int. Cl.
*B23Q 11/10* (2006.01)
*B23B 31/26* (2006.01)

(52) U.S. Cl.
CPC ........ *B23Q 11/1015* (2013.01); *B23B 31/261* (2013.01); *B23B 2250/12* (2013.01); *B23B 2260/03* (2013.01); *Y10T 408/44* (2015.01)

(58) Field of Classification Search
CPC ............ B23B 29/034; B23B 29/03457; B23B 29/03478; B23B 29/03446; B23B 29/0345; B23B 29/03482; B23B 29/03492; B23B 29/0346; B23Q 11/10; B23Q 11/1015; B23Q 11/1023; B23Q 11/103; Y10T 408/44; Y10T 408/45455; Y10T 408/858; Y10T 408/8588; Y10T 408/85884; Y10T 408/85892; Y10T 82/125; Y10T 82/128
See application file for complete search history.

(56) References Cited

U.S. PATENT DOCUMENTS

| | | | |
|---|---|---|---|
| 4,569,115 A * | 2/1986 | Unno | B23B 29/03478 29/558 |
| 4,632,614 A | 12/1986 | Rall | |
| 5,020,946 A | 6/1991 | Nann | |
| 5,970,711 A * | 10/1999 | Kaneko | B60T 8/38 60/562 |
| 6,012,317 A * | 1/2000 | Bonny | B21D 26/045 72/370.22 |
| 6,312,199 B1 | 11/2001 | Sjödén | |
| 2002/0127067 A1 | 9/2002 | Lagerberg | |

(Continued)

FOREIGN PATENT DOCUMENTS

WO  WO2007042020 A2  4/2007
WO  WO2009135660 A1  11/2009

*Primary Examiner* — Nicole N Ramos
(74) *Attorney, Agent, or Firm* — Matthew S. Bedsole (57) ABSTRACT

A clamping unit includes a drawbar having an interior surface defining a fluid transport channel. A fluid transport pipe is at least partially disposed within the interior of the drawbar and is in fluid communication with a fluid transport adapter and a fluid transport channel to enable high pressure fluid to be provided directly to a toolholder. The clamping unit further comprises at least one spring-like member positioned around the outer surface of the drawbar to provide a biasing force against an end plate. The drawbar is movable along a longitudinal axis between a locked position and a tool release position by applying and not applying hydraulic pressure against the end plate, thereby providing a quick-change feature of the invention.

20 Claims, 4 Drawing Sheets

(56) References Cited

U.S. PATENT DOCUMENTS

| | | | |
|---|---|---|---|
| 2004/0191012 A1* | 9/2004 | Sugata | B23Q 11/103 408/57 |
| 2005/0095075 A1* | 5/2005 | Schweizer | B23Q 1/0018 409/136 |
| 2005/0220556 A1* | 10/2005 | Takase | B23B 31/263 409/233 |
| 2005/0232720 A1* | 10/2005 | Lu | B23B 31/265 409/233 |
| 2006/0034670 A1* | 2/2006 | Sugita | B23B 31/265 409/231 |
| 2007/0014647 A1 | 1/2007 | Watzke | |
| 2007/0110533 A1* | 5/2007 | Geissler | B23B 31/261 409/231 |
| 2008/0161176 A1* | 7/2008 | Kitaura | B23B 31/265 409/233 |
| 2010/0266358 A1* | 10/2010 | Hiramoto | B23Q 11/0046 409/137 |
| 2011/0042176 A1* | 2/2011 | Witte | B25B 23/141 192/56.1 |

* cited by examiner

QUICK-CHANGE CLAMPING UNIT FOR TOOLHOLDER AND METHOD OF USING SAME

BACKGROUND OF THE INVENTION

Field of the Invention

The present invention relates to a clamping unit for clamping a toolholder and, in particular to, a quick-change clamping unit with a drawbar having a fluid transport channel and a fluid transport tube at least partially disposed within a drawbar and in fluid communication with a fluid transport channel for allowing high pressure fluid to be provided directly to the toolholder.

Background of the Invention

Tool coupling systems and spindle connector assemblies configured for use with interchangeable cutting or machining tools provide many process efficiencies. A smaller number of machine spindles can be used for a larger variety of machine operations, and downtime between various cutting tasks can be reduced by de-creased need to switch apparatus for each machining application. To realize the foregoing efficiencies, clamping units and spindle connector assemblies must be capable of secure connection with minimal tool change downtime and reduced operator effort to secure the tool head.

Despite the foregoing efficiencies, many prior clamping units and spindle connector assemblies have been deficient in at least one regard. For example, sever-al prior clamping units are limited in their ability to deliver fluid to a cutting edge at pressures greater than about 80 bar. Additionally, as tool diameter increases, the architecture necessary to maintain a secure connection with minimal tool change downtime often results in a greatly increased machine footprint. Such disadvantages can be difficult to address, either singly or in tandem. Therefore, there exists a need for improved clamping units and methods of using the same.

SUMMARY OF THE INVENTION

The problem of providing high pressure fluid (> about 80 bar) to a toolholder is solved by a clamping unit with a drawbar having a fluid transport channel and a fluid transport pipe at least partially disposed within the drawbar to allow high pressure fluid to be provided directly to the toolholder.

In one aspect of the invention, a quick-change clamping unit is described herein. In one aspect, a clamping unit described herein comprises a drawbar having an outer surface and an inner surface defining an interior of the drawbar. The interior of the drawbar defines a fluid transport channel. The drawbar is actuatable along a longitudinal axis between a locked position and a tool release position. At least one spring-like member is positioned around the outer surface of the drawbar.

In another aspect, methods of clamping and/or unclamping a tool into a clamping unit having a drawbar are described herein. In some embodiments, a method comprises actuating the drawbar along a longitudinal axis between a locked position and a tool release position. The drawbar comprises an outer diameter surface and an inner diameter surface defining an interior of the drawbar. Actuating the drawbar towards the unlocked position compresses a first spring-like member positioned around the outer diameter surface of the drawbar.

In a further aspect, clamping units are described herein employing an internal fluid transport channel. For example, in some embodiments, a clamping unit defines a longitudinal axis and comprises a drawbar, an end plate, at least one spring-like member and a fluid transport pipe. The drawbar is positioned substantially parallel to the longitudinal axis and has a first end, a second end, and at least one fluid transport channel extending from the first end to the second end. The drawbar is movable between a locked position and a tool release position. The end plate engages the first end of the drawbar and has at least one fluid transport adapter in fluid communication with the fluid transport channel. At least one spring-like member engages the end plate, the spring-like member being configured to provide a biasing force against the end plate to place the drawbar in the locked position or the unlocked position. The fluid transport pipe is in fluid communication with the fluid transport adapter and the fluid transport channel to provide fluid directly to a toolholder.

In a yet further aspect, methods of flowing fluid through a clamping unit are provided. As described herein, the clamping unit defines a central longitudinal axis and comprises a drawbar, an end plate, at least one spring-like member and a fluid transport pipe. The drawbar has a first end, a second end, and at least one fluid transport channel extending from the first end to the second end. The end plate engages the first end of the drawbar and includes at least one fluid transport adapter in communication with the fluid transport channel. The spring-like member engages at least one of the drawbar and the end plate. The fluid transport pipe engages the fluid transport adapter. Fluid is flowed through the fluid transport pipe, fluid transport adapter and fluid transport channel and exits the fluid transport channel at the second end of the drawbar.

BRIEF DESCRIPTION OF THE DRAWINGS

While various embodiments of the invention are illustrated, the embodiments shown should not be construed to limit the claims. It is anticipated that various changes and modifications may be made without departing from the scope of this invention.

DETAILED DESCRIPTION OF THE INVENTION

Figure 1:
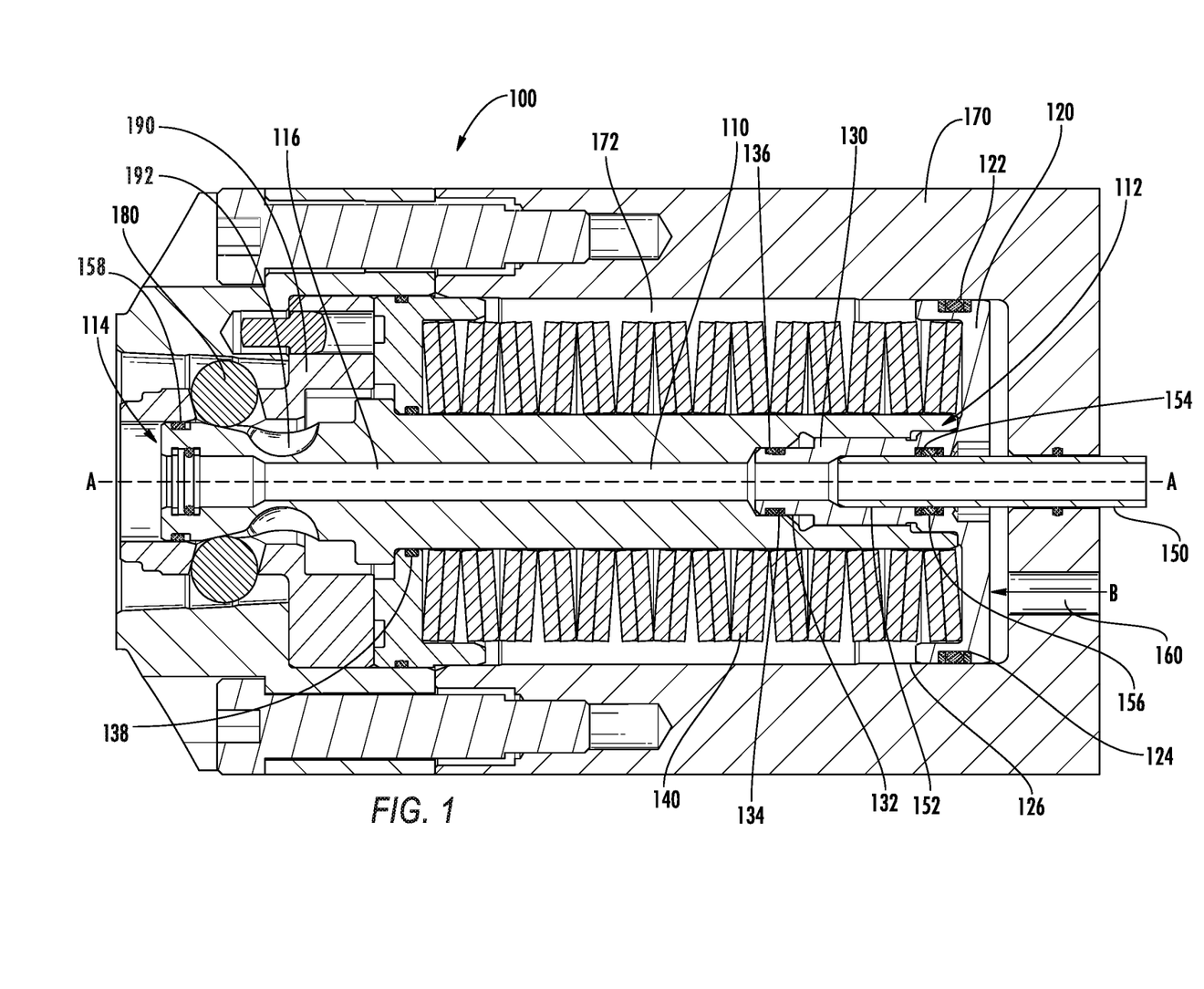
FIG. 1 illustrates a cross-sectional view of a quick-change clamping unit according to one embodiment described herein.

Referring now to FIG. 1, a clamping unit, generally designated as reference number 100, is shown according to an embodiment of the invention. As shown in FIG. 1, the clamping unit 100 defines a longitudinal axis (A-A) and includes a drawbar 110, an end plate 120, at least one spring-like member 140 and a fluid transport pipe 150. The drawbar 110 is positioned substantially parallel to the longitudinal axis (A-A) and has a first end 112, a second end 114 and at least one fluid transport channel 116 extending from the first end 112 to the second end 114. The drawbar 110 is movable between a locked position and a tool release position. The end plate 120 engages the first end 112 of the drawbar 110 and has a fluid transport adapter 130 in fluid communication with the fluid transport channel 116 of the drawbar 110. The spring-like member 140 engages the end plate 120 and is configured to provide a biasing force against the end plate 120 to enable the drawbar 110 to be placed in the locked position or the unlocked position. The fluid transport pipe 150 is at least partially disposed within the drawbar 110 and is in fluid communication with the fluid transport channel 116 and the fluid transport adapter 130. However, it will be appreciated that fluid transport pipe 150 does not need to be at least partially disposed within the drawbar 110.

The clamping unit 100 can comprise any number of components in any configuration not inconsistent with the objectives of the present invention. For example, the clamping unit 100 comprises a clamping unit housing 170 configured to house or contain at least a portion of the clamping unit 100. The clamping unit housing 170 can have any dimensions or any architecture. For example, in some embodiments, the clamping unit housing 170 is sized or configured to be used with static position tools to be clamped or held, such as may be used in a turning application. The clamping unit housing 170 can have at least one recess 172 sized and/or configured to hold one or more other components of a clamping unit 100 as illustrated in FIG. 1.

A drawbar 110 employed in a clamping unit 100 described herein can have any configuration or architecture not inconsistent with the objectives of the present invention. A drawbar 110 is generally movable between a locked position and a tool release position. For example, a drawbar 110 can be configured to apply axial force substantially parallel to the longitudinal axis (A-A). Additionally, a drawbar 110 can be configured to actuate one or more locking members 180 as in the embodiment illustrated in FIG. 1 to engage a radial locking configuration in the form of a canister 190. In addition, the drawbar 110 has a circumferential recess 192. In the illustrated embodiment, the locking members 180 comprise metallic balls. The drawbar 110 has a first end 112 and a second end 114 spaced axially away from the first end 112. The drawbar 110 further comprises at least one fluid transport channel 116 extending from the first end 112 to the second end 114. A fluid transport channel 116 can have any configuration or architecture not inconsistent with the objectives of the present invention. For example, a fluid transport channel 116 can have any cross-sectional shape, such as circular, oblate, or polygonal. In addition, a fluid transport channel 116 can be substantially linear, helical, or curved along at least a portion thereof. In the embodiment illustrated in FIG. 1, the fluid transport channel 116 has a generally circular cross-sectional shape and is aligned to be substantially linear and parallel to the longitudinal axis (A-A). The drawbar 110 can further comprise architecture configured to engage a fluid transport adapter 130, such as illustrated in FIG. 1.

An end plate 120 of the clamping unit 100 can be configured to engage the first end 112 of the drawbar 110 and have the fluid transport adapter 130 in communication with the fluid transport channel 116 of the drawbar 110. The end plate 120 can have a width that is larger than that of a corresponding drawbar 110 as illustrated in FIG. 1. In such embodiments, the end plate 120 can be sized to engage a recess 172 in the clamping unit housing 170 along an engagement surface 126. The end plate 120 can also define at least one seal recess 122 configured to contain at least one seal assembly 124. Such seal assemblies 124 are described in greater detail herein below.

In the illustrated embodiment, the end plate 120 is movable between a tool release position and a locked position. The end plate can be moved or actuated between the locked and tool release positions in any manner or by any means. For example, as shown in FIG. 1, an end plate 120 is movable by hydraulic pressure in the direction of the longitudinal axis A-A. In FIG. 1, the clamping unit housing 170 contains a hydraulic fluid channel 160, and hydraulic fluid can be supplied through the hydraulic fluid channel 160 in the direction indicated by arrow B, thereby applying pressure to the end plate 120.

Figure 3:
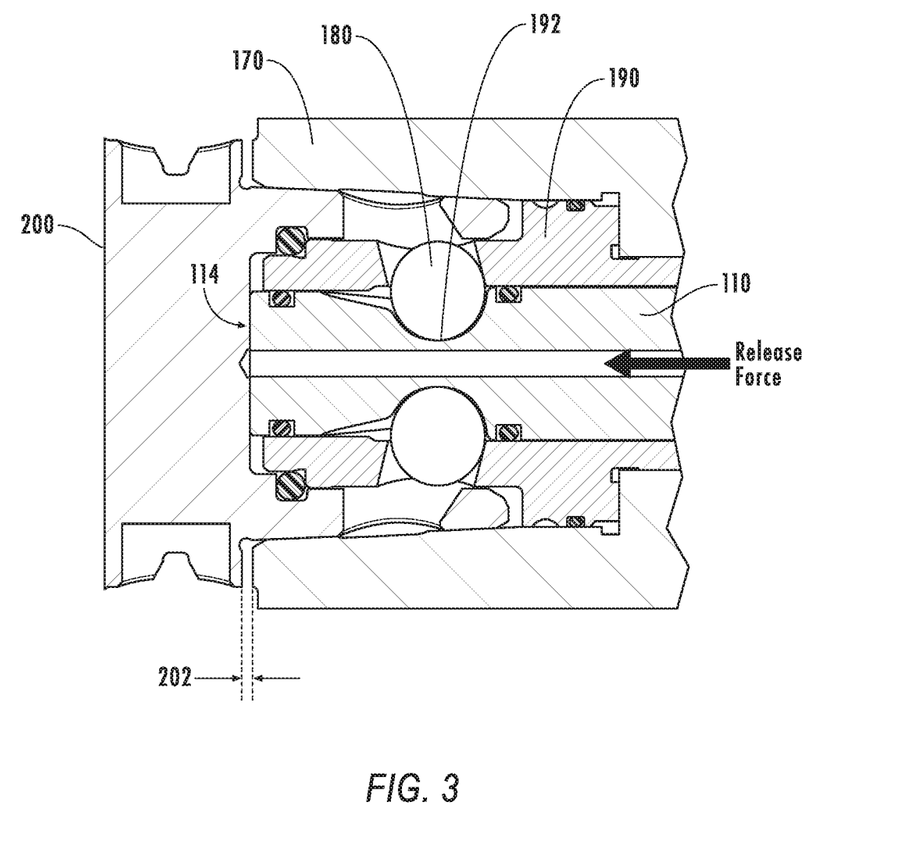
FIG. 3 illustrates a cross-sectional view of a portion of the quick-change clamping unit when in a tool release position.

If the pressure applied by the hydraulic fluid is greater than the biasing force provided by the at least one spring-like member 140, then the end plate 120 moves in the direction along the longitudinal axis A-A (i.e., in the direction of arrow B) to place the clamping unit 100 in the tool release position, as shown in FIG. 3. In the tool release position, the second end 114 of the drawbar 110 engages a toolholder 200 and causes the toolholder 200 to move a small distance 202, also known as a "bump off" distance, such that the toolholder 200 can be removed from the clamping unit 100. As seen in FIG. 3, the locking members 180 are at least partially disposed within the circumferential recess 192 of the drawbar 110.

Figure 4:
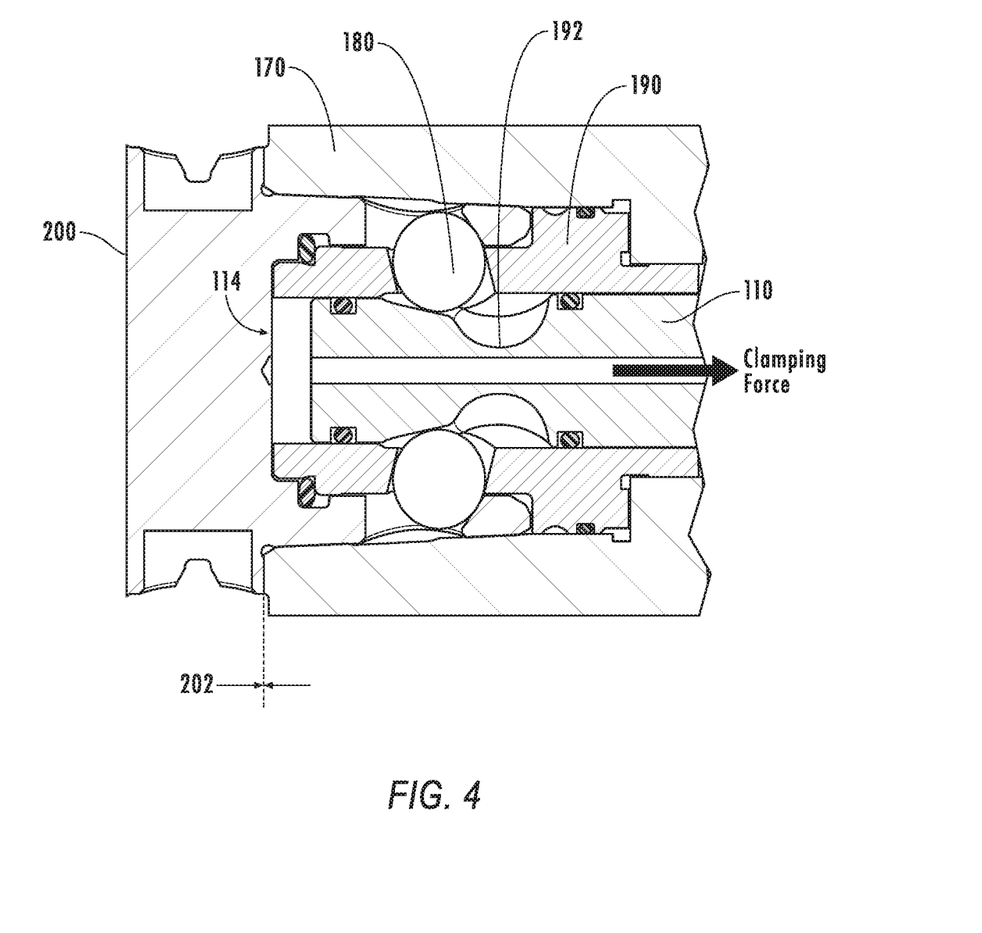
FIG. 4 illustrates a cross-sectional view of a portion of the quick-change clamping unit when in a locked position.

Oppositely, if the hydraulic pressure is less than the biasing force providing by the at least one spring-like member 140, then the end plate 120 moves in the opposite direction along the longitudinal axis A-A (i.e. in the opposite direction of the arrow B) to place the clamping unit 100 in the locked position. In the locked position, the second end 114 of the drawbar 110 no longer engages the toolholder 200 and the distance 202 becomes zero and the toolholder 200 is in face contact with the housing 170. Thus, the clamping unit 100 will be placed in a locked position shown in FIG. 4 when no hydraulic pressure is provided to the end plate 120. As seen in FIG. 4, the locking members 180 are not disposed within the circumferential recess 192 of the drawbar 110.

The fluid transport adapter 130 can extend into the drawbar 110 and contact the fluid transport channel 116 of the drawbar 110 along an engagement surface 132. The fluid transport adapter 130 and/or end plate 120 can be one part that is attached to the drawbar 110, in this case, by threads, and the like. Alternatively, the fluid transport adapter 130 and/or end plate 120 can be press fit, or attached by other means known in the art. The fluid transport adapter 130 can define at least one seal recess 134 along the engagement surface 132 configured to contain at least one seal assembly 136. The fluid transport adapter 130 can also define an engagement surface 152 with a fluid transport pipe 150. The fluid transport adapter 130 can similarly define at least one seal recess 154 configured to contain at least one seal assembly 156. The location of the at least one seal recess 154 is important so that, as the drawbar 130 is pushed forward to the tool release position, the fluid transport pipe 150 and fluid transport adapter 130 remain properly sealed. Seal assemblies 136, 156 configured for such seal recesses 134, 154 are described in greater detail herein below. A fluid transport adapter 130 is further configured to permit fluid flow from a fluid transport pipe 150 to a fluid transport channel 116

The clamping unit 100 further comprises a fluid transport pipe 150. The fluid transport pipe 150 can have any architecture or configuration not inconsistent with the objectives of the present invention. For example, the fluid transport pipe 150 can have any cross-sectional shape, such as a circular, oblate, or polygonal cross-sectional shape. The fluid transport pipe 150 can also be disposed within the clamping unit 100 in any manner not inconsistent with the objectives of the present invention. For example, the fluid transport pipe 150 can be movable relative to the fluid transport adapter 130. In such embodiments, the fluid transport pipe 150 can be connected to the housing 170 such that the fluid transport pipe 150 is movable relative to the fluid transport adapter 130. Radial movement of the pipe will allow axial alignment of the two components, reducing the need for highly accurate location of the two parts, thereby increasing the manufacturability of the design. In some cases, the fluid transport pipe 150 is affixed to the clamping unit housing 170 so that the fluid transport adapter 130 is movable relative to the fluid transport pipe 150, the fluid transport pipe 150 being otherwise stationary. The fluid transport pipe 150 can also be fixed to the drawbar 110 and movable relative to the housing 170. In this case, the fluid transport adapter 130 would be attached to the clamping unit housing 170.

The clamping unit 100 further comprises at least one spring-like member 140. In FIG. 1, for example, the spring-like member 140 comprises a plurality of disc springs configured to provide a biasing force in an axial direction substantially parallel to the longitudinal axis (A-A) to place the drawbar 110 in either the locked or unlocked position. While the spring-like member 140 of FIG. 1 illustrates, a configuration biasing the drawbar 110 in a locked position, other configurations are contemplated in which the biasing force applied by the spring-like member 140 biases the drawbar 110 in the tool release position. The spring-like member 140 can engage one or both the drawbar 110 and the end plate 120 to perform such function. For example, in the embodiment illustrated in FIG. 1, the spring-like member 140 is disposed around the drawbar 110, but may or may not contact or engage the drawbar 110, instead engaging only the end plate 120. In other embodiments not illustrated herein, the spring-like member may operate via hydraulic means or by mechanically applying a biasing force to one or both the drawbar 110 and the end plate 120. The resultant structure from clamping units 100 comprising a spring-like member 140 is a piston-like structure that can be placed in one or both of a locked position and a tool release position.

A seal assembly associated with internal fluid transport pathways of the toolholder can include any seals or seal components capable of operating at fluid transport pressures of at least 80 bar. In some embodiments, seal assemblies, such as those illustrated in FIGS. 1 and 2 having reference numerals 124, 136, 138, 156 and 158, include at least one resilient O-ring style sealing member 124a, 136a, 156a (138a and 158a are not shown in FIG. 2). A sealing member can be formed from rubber or a similar elastomeric material. A seal assembly 124, 136, 156 can further comprise at least one thermoplastic elastomeric ring 124b, 136b, 156b (138b and 158b are not shown in FIG. 2) having desirable characteristics such as extrusion resistance and relatively high hardness as compared to the rubber O-ring sealing members 124a, 136a, 156a. Thermoplastic polyester elastomeric material can have a hardness ranging between about 30 Shore D and about 82 Shore D as tested according to the ASTM D2240 test method. In some embodiments, a thermoplastic polyester elastomeric material used in a ring 124b, 136b, 156b has a hardness of between about 51 Shore D and about 61 Shore D, such as about 56 Shore D.

Figure 2:
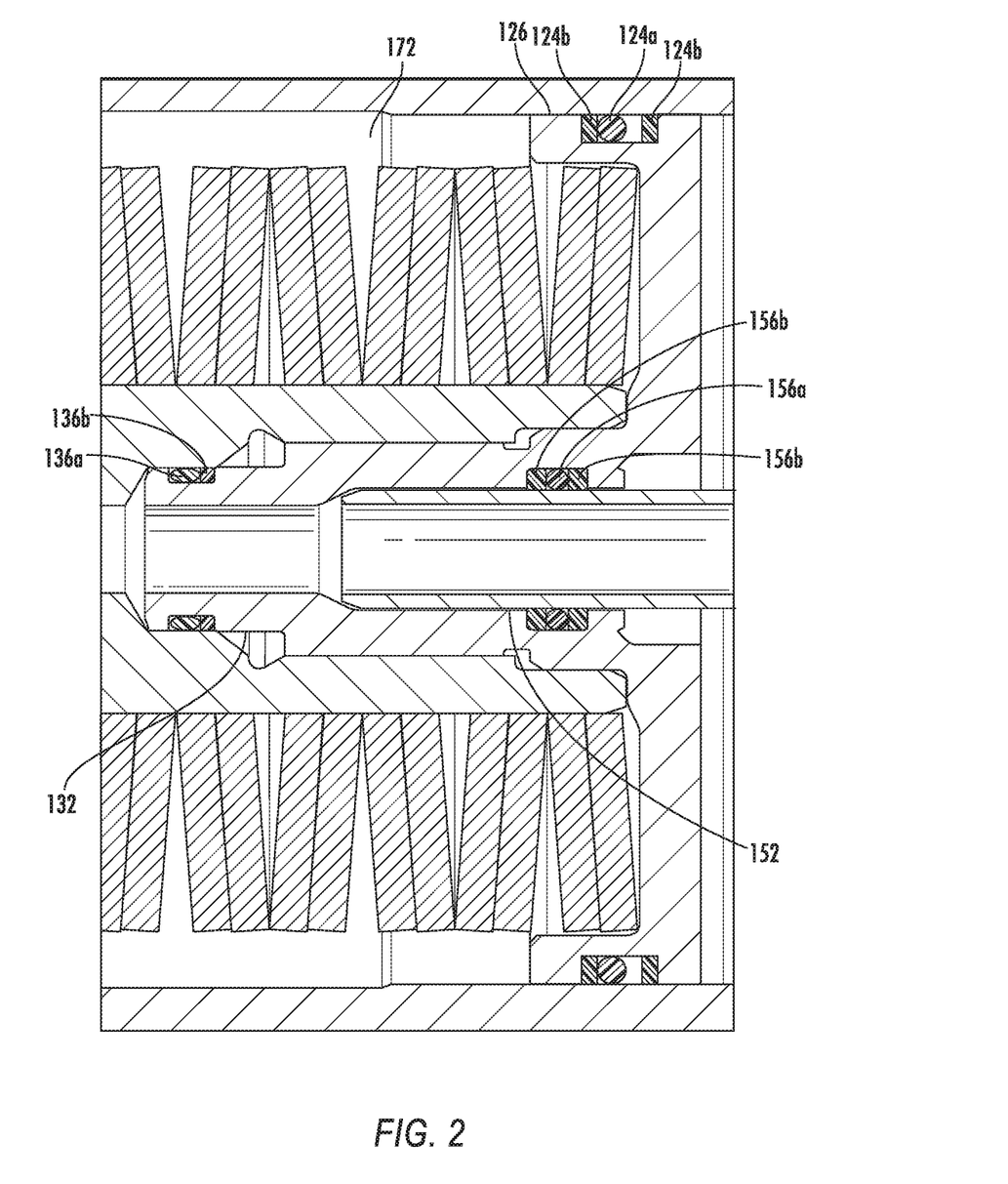
FIG. 2 illustrates a cross-sectional view of a portion of the quick-change clamping unit of FIG. 1.

A seal assembly comprising one or more of the foregoing seal components can be arranged in any manner not inconsistent with the objectives of the present invention. For example, in some embodiments, as illustrated in FIGS. 1 and 2, a seal assembly 124, 156 can comprise at least one O-ring style sealing member 124a, 156a disposed between at least two thermoplastic polyester elastomeric rings 124b, 156b. In other cases, a seal assembly 136 can comprise at least one O-ring style sealing member 136a disposed adjacent to at least one thermoplastic polyester elastomeric ring 136b. Such configurations can, in some cases, be operable at relatively high fluid transport pressures, such as greater than about 80 bar. In some embodiments, such configurations are operable at fluid transport pressures of over 100 bar.

A clamping unit can further comprise fluid passing through the transport pipe and fluid transport channel at a pressure greater than 80 bar. For example, the fluid can be at a pressure of 100 to 500 bar, such as between about 200 and about 500 bar, or between about 300 and about 500 bar. In some embodiments, the fluid can be at a pressure of greater than 200 bar, greater than 300 bar, or greater than 400 bar.

In a yet further aspect, methods of flowing fluid through a clamping unit are described herein. A method described herein comprises providing a clamping unit which defines a central longitudinal axis and comprises a drawbar, and end plate, at least one spring-like member, and a fluid transport pipe. The drawbar has a first end, a second end, and at least one fluid transport channel extending from the first end to the second end, with the end plate engaging the first end of the drawbar. The end plate includes at least one fluid transport adapter in communication with the fluid transport channel. The spring-like member engages at least one of the drawbar and the end plate, and the fluid transport pipe engages the fluid transport adapter. The method further comprises flowing fluid through the fluid transport pipe, through the fluid transport adapter, and through the fluid transport channel such that the fluid exits the fluid transport channel at the second end of the drawbar.

Any clamping unit can be used consistent with the above description. For example, a clamping assembly can comprise at least one seal recess and/or at least one seal operable at fluid transport pressures greater than at least about 80 bar, such as at least about 200 bar or at least about 300 bar. A seal assembly can comprise one or more resilient O-ring style sealing members and/or at least one thermoplastic polyester elastomeric ring. A sealing member can comprise or be formed from rubber or a similar elastomeric material. A thermoplastic polyester elastomeric ring can be formed of any material providing desirable characteristics of flexibility, strength, and processability. For example, any thermoplastic polyester elastomeric material can be used consistent with the above description of such materials.

Individual steps of methods described herein can be carried out in any manner not inconsistent with the objectives of the present invention. In some embodiments, flowing the fluid through the fluid transport pipe and flowing fluid through the fluid transport channel are performed at a fluid pressure of greater than about 80 bar. In certain embodiments, such steps comprise flowing fluid through the fluid transport pipe and fluid transport channel at greater than about 200 bar, or greater than about 300 bar.

Various embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the invention.

Further, it is to be understood that any combination or sub-combination of the above-described clamping units and/or methods can be used. Moreover, any combination or sub-combination of components, configurations, or embodiments can be used to carry out the methods described hereinabove.

The patents and publications referred to herein are hereby incorporated by reference.

Having described presently preferred embodiments the invention may be otherwise embodied within the scope of the appended claims.

What is claimed is:

1. A clamping unit defining a longitudinal axis, comprising:
    a drawbar positioned substantially parallel to the longitudinal axis and having a first end, a second end and at least one fluid transport channel extending from the first end to the second end, the drawbar being movable between a locked position and a tool release position;
    an end plate engaging the first end of the drawbar and having a fluid transport adapter in fluid communication with the fluid transport channel;
    at least one biasing member disposed around the drawbar and engaging the end plate for providing a biasing force against the end plate;
    a hydraulic fluid channel for providing hydraulic fluid at a pressure directly against the end plate; and
    a fluid transport pipe in fluid communication with the fluid transport adapter and the at least one fluid transport channel,
    wherein fluid is directly provided through the fluid transport pipe, the at least one fluid transport adapter and the fluid transport channel to a toolholder.

2. The clamping unit of claim 1, wherein the fluid transport adapter defines at least one seal recess along an engagement surface between the fluid transport adapter and the drawbar.

3. The clamping unit of claim 2 further comprising at least one seal assembly disposed in the seal recess.

4. The clamping unit of claim 1, wherein the fluid transport adapter defines at least one seal recess along an engagement surface between the fluid transport adapter and the fluid transport pipe.

5. The clamping unit of claim 4, further comprising at least one seal assembly disposed in the seal recess.

6. The clamping unit of claim 1, wherein the end plate is movable with the drawbar.

7. The clamping unit of claim 6, wherein the end plate is movable by the hydraulic fluid supplied by the hydraulic fluid channel.

8. The clamping unit of claim 1, wherein the fluid transport pipe is movable relative to the fluid transport adapter.

9. The clamping unit of claim 1, further comprising a housing encasing the drawbar.

10. The clamping unit of claim 9, wherein the end plate engages the housing and defines at least one seal recess along an engagement surface between the end plate and the housing, the seal recess having at least one seal assembly disposed therein.

11. The clamping unit of claim 9, wherein the fluid transport pipe is affixed to the housing.

12. The clamping unit of claim 9, wherein the fluid transport pipe is connected to the housing such that the fluid transport pipe is movable relative to the fluid transport adapter.

13. The clamping unit of claim 9, wherein the fluid transport pipe is connected to the end plate, and wherein the fluid transport adapter is attached to the housing.

14. The clamping unit of claim 1, wherein fluid is capable of passing through the fluid transport pipe, the fluid transport adapter and the fluid transport channel at a pressure greater than 80 bar.

15. The clamping unit of claim 14, wherein the fluid is at a pressure of greater than 100 bar.

16. The clamping unit of claim 1, further comprising at least one seal assembly having at least one thermoplastic polymer elastomeric ring having a hardness between about 51 Shore D and about 61 Shore D.

17. A clamping unit defining a longitudinal axis, comprising:
    a drawbar positioned substantially parallel to the longitudinal axis and having a first end, a second end and at least one fluid transport channel extending from the first end to the second end, the drawbar being movable between a locked position and a tool release position;
    an end plate engaging the first end of the drawbar and having a fluid transport adapter in fluid communication with the fluid transport channel;
    at least one biasing member disposed around the drawbar and engaging the end plate for providing a biasing force against the end plate;
    a fluid transport pipe in fluid communication with the fluid transport adapter and the at least one fluid transport channel; and
    a hydraulic fluid channel for providing hydraulic fluid at a pressure directly against the end plate,
    wherein the clamping unit is placed in the tool release position when the pressure of the hydraulic fluid is greater than the biasing force provided by the at least one biasing member against the end plate, and
    wherein the clamping unit is placed in the locked when the pressure of the hydraulic fluid is less than the biasing force provided by the at least one biasing member against the end plate.

18. A method of providing fluid through a quick-change clamping unit to a toolholder, the quick-change clamping unit comprising defining a central longitudinal axis and comprises a drawbar positioned substantially parallel to the longitudinal axis and having a first end, a second end and at least one fluid transport channel extending from the first end to the second end, the drawbar being movable between a locked position and a tool release position, an end plate including at least one fluid transport adapter in fluid communication with the fluid transport channel, a hydraulic fluid channel for providing hydraulic fluid at a pressure directly against the end plate, and a fluid transport pipe in fluid communication with the at least one fluid transport adapter and the at least one fluid transport channel, the method comprising:
    providing fluid through the fluid transport pipe;
    providing fluid through the fluid transport adapter;
    providing hydraulic fluid at a pressure through the hydraulic fluid channel directly against the end plate; and
    providing fluid through the fluid transport channel such that the fluid exits the fluid transport channel at the second end of the drawbar directly to a toolholder.

19. The method of claim 18, wherein the fluid flows through the fluid transport pipe and through the fluid transport channel at a fluid pressure of greater than about 80 bar.

20. The method of claim 18, wherein the fluid flows through the fluid transport pipe and through the fluid transport channel at a fluid pressure of greater than about 100 bar.

* * * * *